Dec. 27, 1955   H. O. SUDBRINK   2,728,293
METHOD OF MAKING MOLDED TYPE BARS
Filed Oct. 30, 1952   2 Sheets-Sheet 1

Inventor
Harold O. Sudbrink
By Fidler, Crowe & Beardsley
Attys.

Dec. 27, 1955   H. O. SUDBRINK   2,728,293
METHOD OF MAKING MOLDED TYPE BARS
Filed Oct. 30, 1952   2 Sheets-Sheet 2
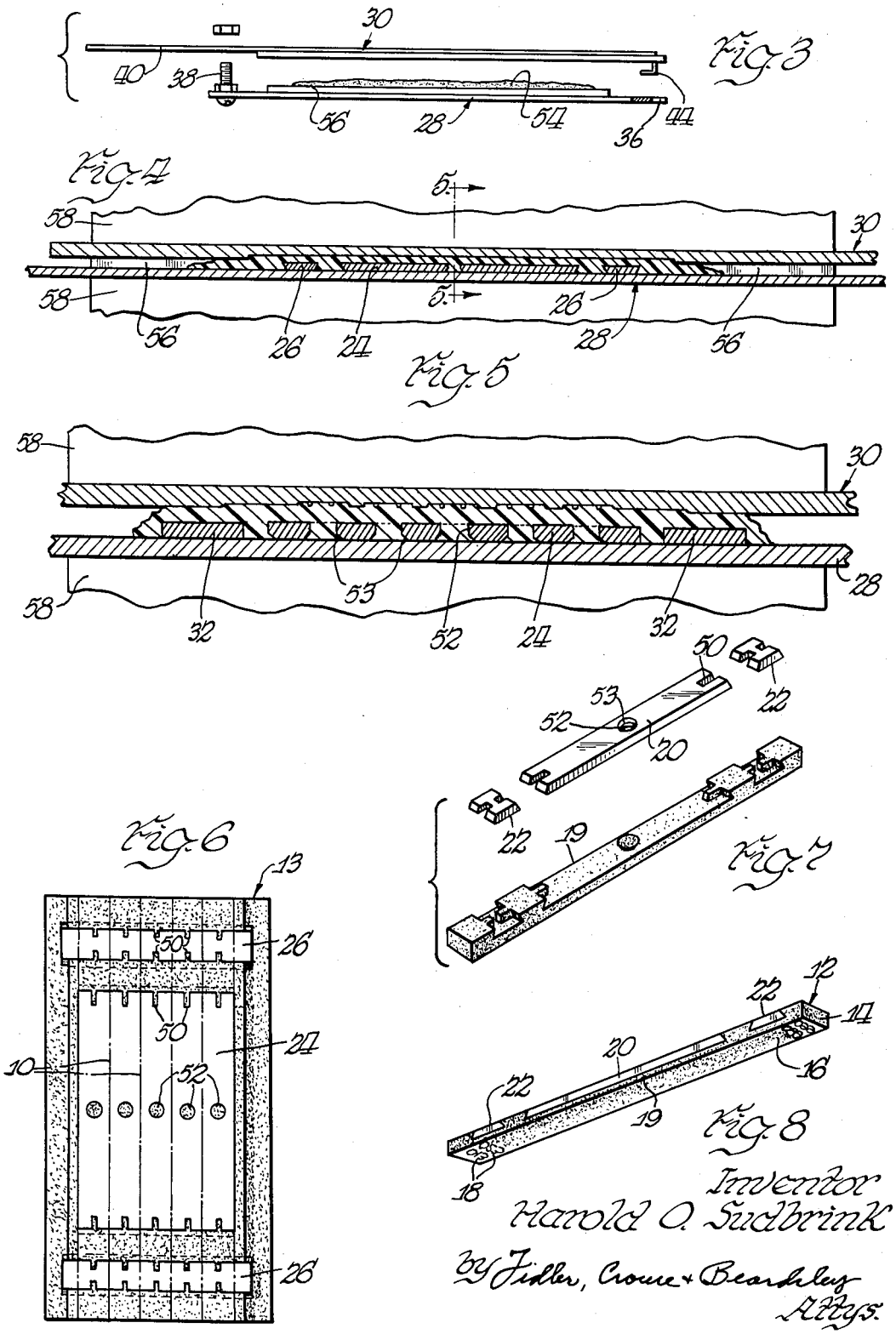
Inventor
Harold O. Sudbrink
By Fidler, Crowe & Beardsley
Attys.

United States Patent Office 2,728,293
Patented Dec. 27, 1955

2,728,293

METHOD OF MAKING MOLDED TYPE BARS

Harold O. Sudbrink, Deerfield, Ill.

Application October 30, 1952, Serial No. 317,730

6 Claims. (Cl. 101—401.1)

The present invention relates generally to a method for making molded articles and has to do more particularly with a method for molding weighted type bars suitable for use in connection with slidable poises for scale beams.

This application is a division and continuation-in-part of my copending application, Serial No. 244,846, filed September 1, 1951.

In my copending parent application above referred to, I have disclosed and claimed an accurately weighted and balanced type bar for use in connection with slidable poises for scale beams whereby the type bars can be exchanged, when the load ratio of the weight with which the type bar is used is to be changed, without thereby necessitating recalibration of the scale as has heretofore been the case. The type bar disclosed in the above identified application comprises generally a type bar having on its printing surface indicia for printing consecutive numbers representing weights and provided with a weighted insert accurately positioned intermediate its ends but extending to the sides thereof and, if desired, provided with metal mounting inserts spaced from the ends of the weighted insert.

The conventional method of making type bars or plates consists in placing a matrix having type forming characters on one face thereof and facing upwardly, depositing molding material over this surface and placing a press plate on top of the material, whereupon the assembly is placed in a molding press for applying pressure and heat to the assembly. This method is, however, not practicable where an insert is to be molded in a predetermined position in the type bar or plate of the character disclosed in my above application. It is, therefore, contemplated by the present invention to provide a novel method of making the type bars or type plates of the general character disclosed in my above application.

Accordingly, one object of the present invention is to provide a novel method of molding type bars having inserts therein.

Another object is to provide a novel method of making molded type bars or type plates having a weighted insert therein in an exact predetermined position.

Another object is to provide a novel method of making molded type bars or type plates having a weighted metal insert therein in an exact predetermined position, and spaced from each end of the weighted insert a metal mounting insert.

These and other objects and advantages of the present invention will be apparent from the following description taken together with the accompanying drawings, in which—

Fig. 3 is a side elevational view of the mold with the mold parts in spaced relation and showing a quantity of material to be molded;

Fig. 4 is a longitudinal vertical sectional view through the mold in the molding position, and through the molded type plate in the mold;

Fig. 5 is an enlarged transverse vertical sectional view taken on line 5—5 of Fig. 4;

Fig. 6 is a plan view of the article molded according to the invention, the article being in the form of a plate to be cut into a plurality of type bars;

Fig. 7 is an exploded perspective view of a type bar made according to the invention; and Fig. 8 is a perspective view of a completed type bar, showing the printing face thereof.

Figure 1:
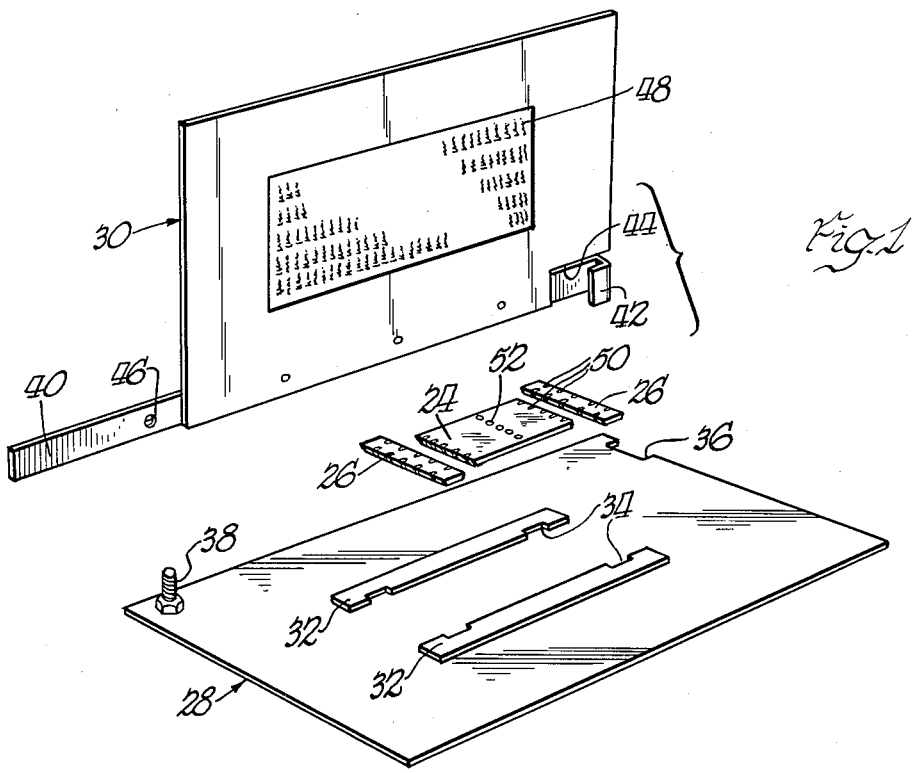
Figure 1 is an exploded view of a mold in open position, utilized in carrying out the present invention, and the metal inserts to be embedded in the molded article.

The accompanying drawings illustrate one form of mold suitable for molding type bars with inserts accurately positioned therein for distributing the weight of the molded article. In the drawings the complete molded article, which in the present instance is a type bar 12, is shown in its entirety in Fig. 8 and constitutes one of a plurality of similar type bars cut from the molded type plate 13 of Fig. 6.

Figure 2:
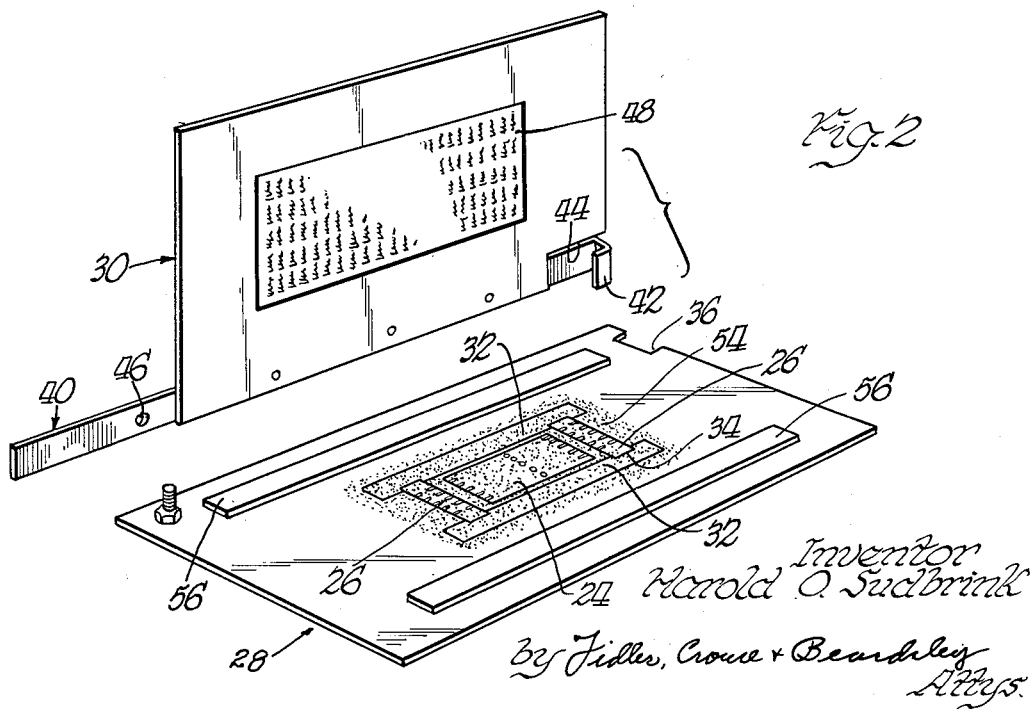
Fig. 2 is a view similar to Fig. 1 but showing the metal inserts in place on the base plate of the mold, and indicating a quantity of powdered material to be molded.

Figs. 1 and 2 show in exploded perspective view the preferred form of mold for molding the article of Fig. 6, which is a type plate from which a plurality of type bars are formed. The metal inserts to be included in the type plate are placed in the mold after which the material forming the remainder of the molded article is placed over the inserts. The inserts embedded in the type plate of Fig. 6 are of proper size and shape as to be capable of forming the desired size of inserts in the type bars which are cut from the type plate.

The type bar 12 made according to the method of the present invention, is in the form of an elongated bar, rectangular and uniform in cross section and having end surfaces 14 perpendicular to the other surfaces. One face 16 of the type bar is provided with a plurality of type characters 18 preferably in relief, which, in the present instance, represent amounts of weights since the type bar is for use in scales. The type bar has a range of numerals 18 for use in connection with similar type bars having a different but contiguous range of numerals in an arrangement in which the type bars are placed end to end with their end surfaces 14 abutting. The type bar 12 includes a body 19 of a relatively light weight plastic suitable for molding and forming printing type, and a high density non-corrosive metal insert 20 for adding weight to the type bar and distributing the weight so as to predetermine and accurately position the center of gravity thereof. The insert 20 is preferably of lead, to the end that ample total weight of the type bar will be provided. The type bar also is preferably provided with additional inserts 22 which serve as mounting or anchoring elements and are preferably of aluminum, the latter elements being disposed longitudinally beyond or in spaced relation from the ends of the insert 20. The inserts 22 are adapted to be tapped for receiving mounting screws in mounting the type bar on a scale beam poise element as fully brought out in the above application.

The molded type plate 13 from which a plurality of type bars 12 are cut is provided with a metal insert 24 of a width at least equal to and preferably slightly greater than the number of type bars intended to be formed therefrom. In the present instance the type plate is of sufficient width to form five type bars 12. The inserts 26 of Fig. 6, when cut or divided with the type plate, form the mounting inserts 22 and similarly to the insert 24, are of a length at least as great as the width of five type bars, and they are preferably substantially longer than that dimension so as to cooperate with certain elements of the mold in which the article is molded.

The mold shown in Figs. 1 and 2 in exploded perspective view includes a base plate or jig 28 and a press plate or matrix 30. The base plate or jig is essentially a metal plate preferably of copper and hence of good heat-conducting qualities. For the purpose of positioning the inserts 24 and 26 in the desired position in the mold and hence in the molded type plate, a pair of strips 32 are secured to the upper surface of the base plate or jig 28 by suitable means such as by brazing. These strips 32 are spaced in parallel arrangement and are provided with relatively inwardly and interfacing notches 34 adjacent the ends for receiving and positioning the inserts 26, the spacing apart of the strips 32 being such as desired for the proper width of the molded type plate to provide the desired number of type bars to be formed therefrom.

The base plate or jig 28 is provided with a notch 36 adjacent one corner, and adjacent another corner a locking means which may be in the form of a screw 38 for cooperation with the press plate 30 in retaining the latter in proper registering position with respect to the base plate in a molding operation. To this end the press plate 30 is provided with a suitable anchoring means which may take the form of a strip 40 which may be of metal suitably secured to the press plate 30 and having a hook-like element 42 disposed in a cut-out portion 44 for engagement with the base plate in the notch 36. The strip 40 is also provided with an aperture 46 for receiving the screw 38 after which suitable means such as a nut (Fig. 3) may be threaded on the screw 38 for retaining the press plate properly located on the base plate.

The press plate 30 or matrix is composed of a suitable material, preferably a thermosetting plastic such, for example, as "Bakelite #2" as manufactured by The Bakelite Corporation and is provided adjacent its center with a matrix proper 48 positioned so as to be in register with the area between the strips 32 on the base plate when the press plate is in proper position on the base plate as positioned by the locating elements 36, 38, 42 and 46. The matrix proper 48 is formed by any suitable known process, such as being made directly from an electrotype, and in the present instance is preferably of intaglio shape so as to produce the desired relief on the molded type plate and type bars.

It will be understood that the type plate can be made of any desired size and the strips 32 and inserts 26 will be of the proper spacing and dimensions in accordance with the size of type plate to be formed. The insert 24 is of course of uniform thickness and length, and the inserts 26 are of uniform thickness, as well as uniform width at least in that portion between the strips 32. The lead insert 24 is placed in position on the base plate or jig 28 between the strips 32 and between the inserts 26 as shown in Fig. 2. If desired, the insert 24 may be of a width slightly less than the distance between the strips 32 but in any event it is of proper width that when it is divided according to the number of type bars to be formed, it provides an insert 20 extending throughout the width of each type bar. The insert 24 may be of any desired predetermined length so long as a suitable space remains between that insert and each of the mounting inserts 26, as shown in Figs. 2 and 6, so as to effectively lock the inserts in place in the molded article by locking engagement of the molded material therewith.

The side surfaces of the inserts 26 and the end surfaces of the insert 24 are tapered for producing a wedging and locking effect in the completed molded article. Also, the tapered edges of the inserts 24 and 26 are provided with slots or saw cuts 50 extending preferably at least through the tapered portions, and may extend somewhat therebeyond for receiving portions of the molded material, for locking the inserts against displacement from the completed type bars in transverse directions. Additionally the lead insert 24 is provided with a plurality of apertures 52 generally in line with the slots 50 for receiving portions of the molded material. The marginal edges of the apertures at the surfaces that engage the base plate 28 are slightly countersunk at 53 (Fig. 5) for providing additional interlocking elements for retaining the inserts in the completed type bars.

Inserts 24 and 26 are placed on the base plate 28 with their narrow surfaces disposed downwardly in the position shown in Fig. 2. The area in which the inserts are placed is then covered with powdered moldable material 54 which in the present instance may be of any desired moldable plastic well known on the market, such for example as "bakelite" powder, known as "V. Y. N. S." as manufactured by The Bakelite Corporation. Over this material may be placed a surface hardener, such for example as Vinylite plate powder known as "bakelite" #9400 as manufactured by The Bakelite Corporation. The material 54 of course entirely covers the inserts and fills the spaces therebetween and also the space longitudinally beyond the inserts between the strips 32, that is, sufficient powder is utilized to form the completed type bar and may cover an area greater than that indicated, all excess being later trimmed off to form the type plate of the size desired and with the inserts properly positioned therein.

Spacers 56 in the form of suitable strips are loosely laid on the base plate 28 for engagement by the press plate and limiting the movement of the latter toward the base plate for determining the thickness of the type plate to be molded. After the foregoing steps have been performed, the press plate is put in position on the base plate in the manner mentioned and the assembled unit is placed in a suitable press (58, Figs. 4 and 5) and the molding operation is performed. Suitable pressure and heat are applied. I have found that satisfactory results have been accomplished by applying 28 tons per square inch pressure and heat at 290° F., with six minutes of heating and eight minutes of pressure. This pressure and heat are applied regardless of the size of the article to be formed. The molded material is pressed to the thickness of the strips 56, with the material flowing longitudinally as necessary. The assembled unit is then removed from the press and placed in a cooling press where it is cooled in accordance with standard practice. The molded type plate is then removed and appears as shown in Fig. 6, after peripheral portions have been removed.

The type plate thus molded in accordance with the above described steps and as shown in Fig. 6 is cut along the dot-dash lines 60 for forming the individual type bars 16. As the various elements and parts are arranged in Fig. 6, each type bar 12 cut from the molded article includes one of the slots 50 in each edge of each of the inserts molded therein, and the weight insert 20 includes one of the apertures 52. In the molding operation the intense pressure and heat applied causes the molded material to flow into the spaces between the inserts and under the undercut portions formed by the tapered edge surfaces thereof. The material is also forced through the apertures 52 and fills the undercut portions 53 forming additional interlocks between the weight insert 24 and the molded material. Thus when the type bars 12 are cut from the type plate, the portions of molded material extending into the slots 50 prevent the inserts from displacement in transverse directions and the wedging effect brought about by the tapered edge surfaces (see particularly Fig. 8) prevents the inserts from being removed out of the molded material in a direction perpendicular to the face of the bar. The material in the aperture 52 also aids in preventing displacement or removal of the insert 20 in transverse directions. The inserts thus are retained in the type bar entirely by mechanical interlock and no form of adhesive material is employed for the purpose.

The overall weight of the type bar 12 must be held to accurate measurement and distribution. Each piece or metal insert must be accurate to within a tolerance of 20 grams plus, with no tolerance in minus directions. The inserts extend to the lateral edges of the type bar and the whole type bar may be ground off including the inserts for changing the weight of the type bar or the distribution thereof. Aluminum experiences substantially no shrinkage, at least from a practical standpoint, and the same is true with respect to lead. The molded material therefore, when molded into locking engagement with the tapered edge surfaces of the inserts, remains in firm engagement with those surfaces due to the substantial absence of shrinkage of the inserts.

The method of the present invention enables type bars to be made with inserts placed accurately therein. The inserts are placed on the base plate or jig 28 and the two end inserts are maintained in position thereon by the strips 32. In order for the inserts to be accurately positioned in the molded article, it is necessary that they be exposed through one surface of the molded article because it would be impossible to control the position of the inserts within a molded article when they are entirely surrounded by the molded material. Therefore, the inserts must engage the surfaces of one of the mold elements and in the exercise of the present invention they are placed on the bottom or lower mold element, namely, the base plate. Then the material to be molded is placed over the insert. Thus the inserts are placed in position where their proper positioning can be observed visually, and the mold parts are locked in position in the molding operation in accordance with the observed position of the inserts. When the type plate is trimmed symmetrical with the molded type characters as formed by the matrix proper 23, the inserts are accurately positoned in the type plate. The strips 32 locate and determine the position of the inserts and although the inserts are covered with moldable material, after they are put in such position the press plate is properly registered with the inserts by reason of the locking interengagement between the elements 36, 38, 42 and 46.

The substantial absence of shrinkage of the inserts assures maintenance of accurate length of the type bar and consequent accurate distribution of the weight thereof. Thus when the type bar is mounted on a scale beam, or any element thereon, printing effected by any portion throughout its full length will be accurate according to the actual weight of the load being weighed. Maintenance of accurate pressure and heat in all molding operations assures uniformity between type bars, with consequent accurate weighing operations.

Although the article as disclosed herein and made according to the present invention is a type bar for scales, it is to be understood that the invention is not limited to making such articles, but is applicable to making other articles as well.

I claim:

1. A method of making a type bar having a predetermined weight and a center of gravity located at the midpoint between the ends thereof comprising the steps of placing a metal bar weight of a predetermined thickness and length in a type bar mold centrally with respect to the ends of the mold, placing a body of moldable material suitable for forming the printing surface on top of the material, molding the bar in the material while forming the type characters on the top surface in juxtaposed relation with respect to said weight and machining the sides of the molded type bar and metal bar weight so as to give the bar a uniform cross section throughout its length and to reduce the total weight of the bar to a predetermined value.

2. A method of making weighted balanced type bars comprising the steps of placing a metal bar weight centrally in a type bar mold, placing a metal bar between each side of the first bar weight and the ends of the mold, placing moldable material suitable for forming printing type on top of the assembled bars, placing a type forming member on top of the material, molding the material into a rectangular block with molded material between the metal bars and the top surface of the block, cutting said molded block into separate type bars, finishing the sides of the individual type bars so as to form them to a predetermined uniform cross section and to reduce the total weight of the bar to a predetermined value, and tapping mounting holes in the inserts located near the ends of the type bars from the underside of the bars.

3. A method of making a weighted balanced type bar, comprising the steps of placing a metal weight on a base, placing moldable material suitable for making printing type over the weight, applying pressure to the moldable material in the direction toward the base while forming type characters on the top surface of the material in juxtaposed position with respect to the weight, permitting the material to flow laterally about the weight and forming the molded material with the weight therein and with molded material between the weight and the top surface to substantially uniform thickness, and removing material from the ends of the molded article to form a type bar of predetermined length with the weight disposed midway between the ends thereof and removing material including material from the metal weight from the sides of the bar until the bar has a predetermined weight.

4. A method of making a weighted balanced type bar, comprising the steps of placing a metal weight of uniform thickness on a base, placing moldable material suitable for making printing type over the weight and on the base beyond the weight in both directions longitudinally thereof, placing a type forming member on top of the material, applying pressure by means of a press to the member and the moldable material in the direction toward the base permitting the material to flow laterally on the base, providing abutment means on said base extending upwardly therefrom for absolutely limiting movement of the press, and forming a molded article having substantially uniform thickness equal to the height of the abutment and with molded material between said weight and the top surface of the bar, removing peripheral portions of the molded article and said weight to form a type bar of uniform width and of predetermined total weight with the metal weight disposed midway between the ends thereof.

5. A method of making a type bar having a weight embedded in molded material with a surface exposed and flush with a surface of the molded material, in which the weight has conformations about which the material is molded to form interlocking portions for preventing removal of the weight from the material, comprising the steps of placing the weight on a base in such position that the conformations thereon form undercut portions, placing moldable material over the weight, placing a type forming member on top of the material, applying a press to the material and member with sufficient pressure to force the material into the undercut portions, permitting the material to flow laterally and forming the material with the weight embedded therein to substantially uniform thickness with molded material between said weight and the top surface of the bar, and removing peripheral portions of the molded article and the weight embedded therein to shape it to a type bar of uniform width and of a predetermined total weight.

6. A method of making type bars each having a weight embedded in a molded material, comprising placing the weight on a base, placing moldable material over the weight and on the base surrounding the weight, placing a type forming member on the material, applying a press to the moldable material and member, thereby forming a plurality of groups of type characters with each group extending longitudinally and centered longitudinally relative to the weight and forming the moldable material with the weight embedded therein to substantially uniform thickness with molded material between the weight and the top surface of the molded article, trimming the molded article by removing the peripheral portions thereof surrounding the area containing the type characters, cutting the trimmed article longitudinally between adjacent groups of characters to form individual type bars, and machining the side edge surfaces of type bars including the embedded weight to render them uniform in width and of a predetermined weight.

References Cited in the file of this patent

UNITED STATES PATENTS

| | | |
|---|---|---|
| 685,474 | Hill | Oct. 29, 1901 |
| 927,598 | Richards | July 13, 1909 |
| 1,290,821 | Winslow | Jan. 7, 1919 |
| 1,379,433 | Yeoell | May 24, 1921 |
| 1,707,729 | Kelly | Apr. 2, 1929 |
| 1,810,088 | Schmutz | June 16, 1931 |
| 1,976,714 | Chisholm | Oct. 16, 1934 |
| 2,298,365 | Gits et al. | Oct. 13, 1942 |
| 2,330,002 | Moss et al. | Sept. 21, 1943 |
| 2,355,949 | Boutwell | Aug. 15, 1944 |
| 2,361,139 | White et al. | Oct. 24, 1944 |
| 2,427,836 | Chollar et al. | Sept. 23, 1947 |
| 2,596,715 | Oettinger | May 13, 1952 |

OTHER REFERENCES

Simonds et al.: Handbook of Plastics, 2nd ed., 1949. Van Nostrand Co., New York. Only pages 1179 to 1182 and 1191 to 1197 cited.

Dubois: Plastics, rev. ed., 1943. American Technical Society, Chicago. Only pages 269 to 273 cited. Copy available in Division 17.